(12) United States Patent
Wild et al.

(10) Patent No.: US 10,865,887 B2
(45) Date of Patent: Dec. 15, 2020

(54) VALVE ASSEMBLY

(71) Applicant: ALCO VALVES GROUP LIMITED, West Yorkshire (GB)

(72) Inventors: David Wild, West Yorkshire (GB); Andrew Crabtree, West Yorkshire (GB)

(73) Assignee: ALCO VALVES GROUP LIMITED, West Yorkshire (GB)

( * ) Notice: Subject to any disclaimer, the term of this patent is extended or adjusted under 35 U.S.C. 154(b) by 0 days.

(21) Appl. No.: 15/524,907

(22) PCT Filed: Oct. 1, 2015

(86) PCT No.: PCT/GB2015/052870
§ 371 (c)(1),
(2) Date: May 5, 2017

(87) PCT Pub. No.: WO2016/055770
PCT Pub. Date: Apr. 14, 2016

(65) Prior Publication Data
US 2017/0314686 A1    Nov. 2, 2017

(30) Foreign Application Priority Data
Oct. 6, 2014    (GB) .................................. 1417612.7

(51) Int. Cl.
*F16K 5/06*      (2006.01)
*F16K 27/06*     (2006.01)
*F16K 31/60*     (2006.01)

(52) U.S. Cl.
CPC .......... *F16K 5/0642* (2013.01); *F16K 27/067* (2013.01); *F16K 31/60* (2013.01); *Y10T 137/6035* (2015.04)

(58) Field of Classification Search
CPC ...... F16K 27/067; F16K 5/0642; F16K 31/60; Y10T 137/0635
See application file for complete search history.

(56) References Cited
U.S. PATENT DOCUMENTS 4,262,688 A    4/1981   Bialkowski
6,206,028 B1   3/2001   Holden et al.
(Continued)

FOREIGN PATENT DOCUMENTS

GB    974911 A    11/1964
GB    2081842 A    2/1982
(Continued)

OTHER PUBLICATIONS

International Preliminary Report on Patentability dated Apr. 20, 2017, for corresponding PCT Application No. PCT/GB2015/052870.

(Continued)

*Primary Examiner* — Kevin R Barss
(74) *Attorney, Agent, or Firm* — Kinney & Lange, P.A.

(57) ABSTRACT

There is provided a valve assembly, the valve assembly including a body (8) in which there is housed at least one valve ball (22, 24), a movement assembly (32, 34) for moving the ball between closed and open positions with respect to a channel which passes through the body. At respective ends of the valve body there is provided sealing means (38) including a valve seat, biasing means to bias the valve seat towards contact with the ball, and at least one annular member engaged with the valve body to retain the valve seat, biasing means and at least one ball in the valve body and form a modular unit. Positioned in the valve body outwardly of each of the sealing means, there is provided a fitting means (50) engaged with the valve body and the form (Continued)

Figure 1:
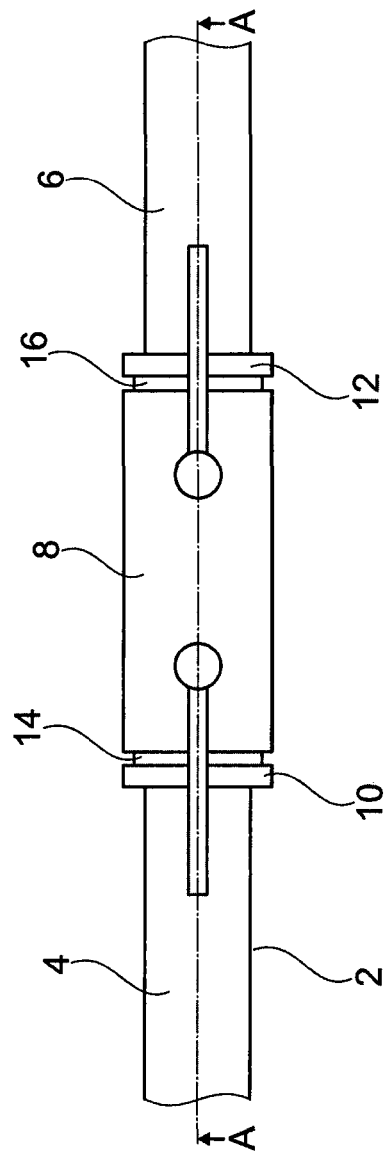

of the fitting means is selected and fitted to the modular unit independently of the said at least one annular member.

9 Claims, 6 Drawing Sheets

(56) References Cited

U.S. PATENT DOCUMENTS

| | | | | |
|---|---|---|---|---|
| 6,681,802 | B2* | 1/2004 | McHugh | F16K 11/0873 |
| | | | | 137/559 |
| 7,690,626 | B2* | 4/2010 | Stunkard | F16K 5/0642 |
| | | | | 251/174 |
| 8,418,277 | B2* | 4/2013 | Okubo | E03D 5/01 |
| | | | | 4/332 |
| 9,303,774 | B2* | 4/2016 | Lomax | F16K 5/201 |
| 2005/0252560 | A1* | 11/2005 | Anderson | F16K 11/0876 |
| | | | | 137/625.47 |
| 2014/0001388 | A1* | 1/2014 | Lomax | F16K 5/0631 |
| | | | | 251/181 |

FOREIGN PATENT DOCUMENTS

| | | |
|---|---|---|
| WO | 0133119 A1 | 5/2001 |
| WO | 03093707 A2 | 11/2003 |
| WO | 2012032356 A2 | 3/2012 |

OTHER PUBLICATIONS

International Search Report and Written Opinion dated Jan. 15, 2016, for corresponding PCT Application No. PCT/GB2015/052870.

* cited by examiner

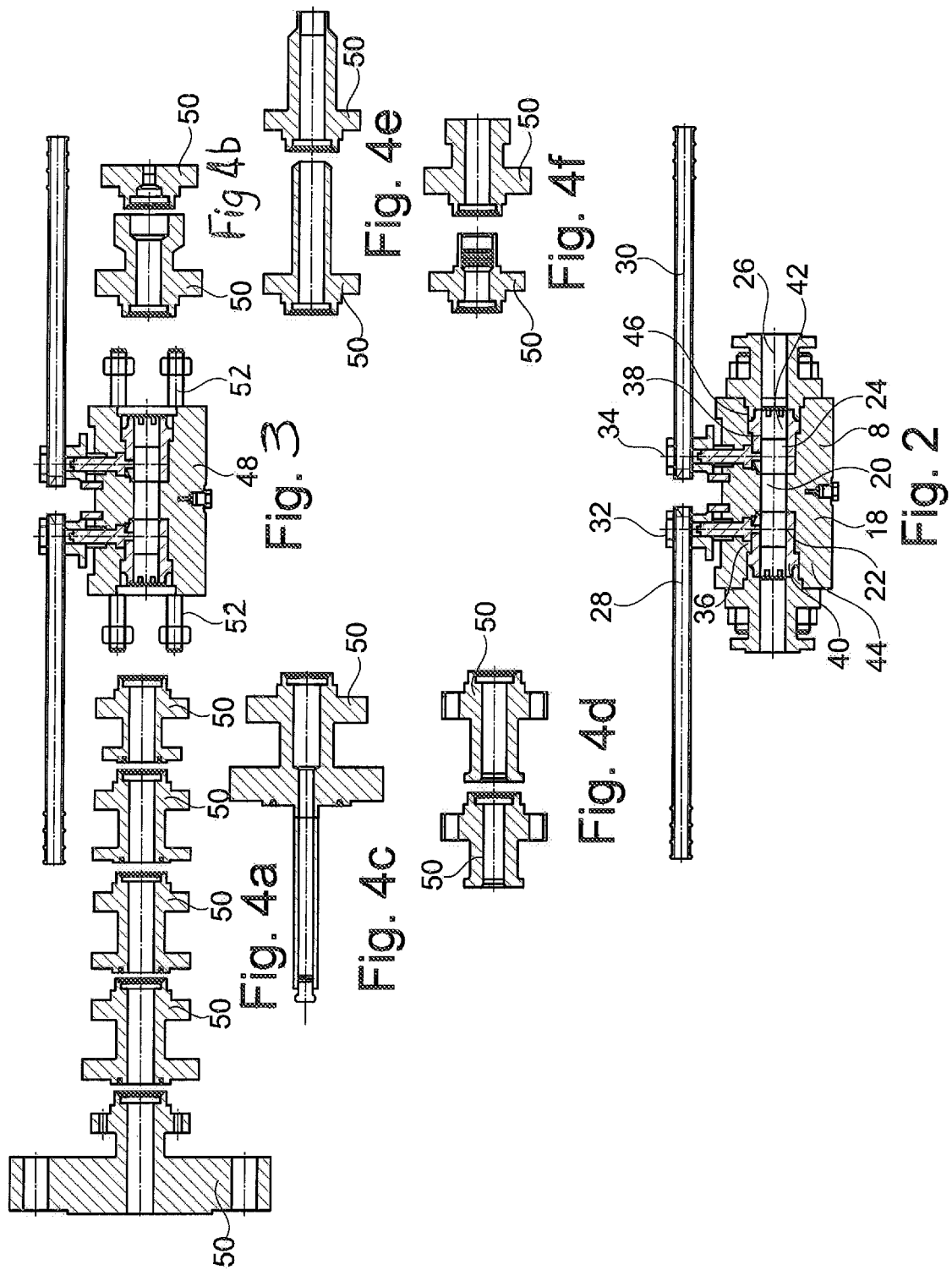

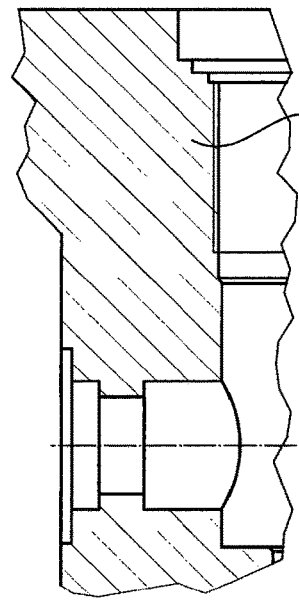
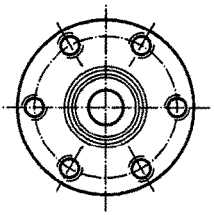
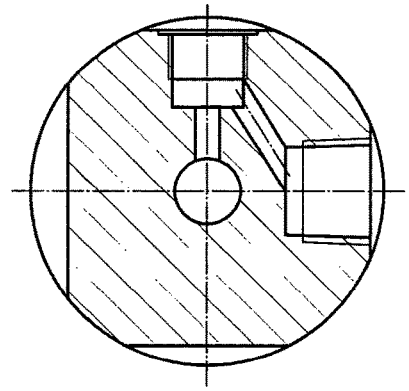
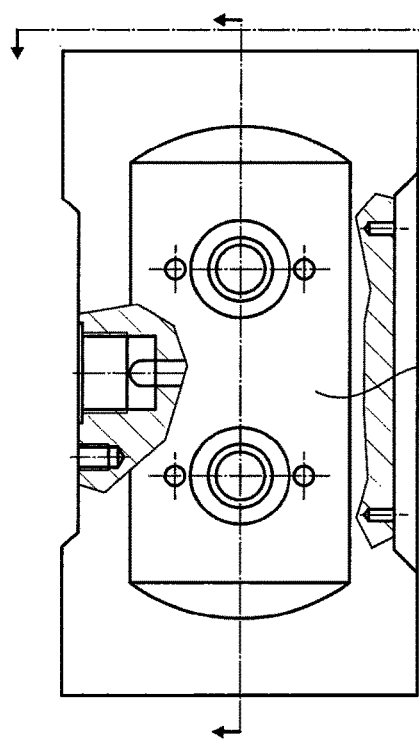
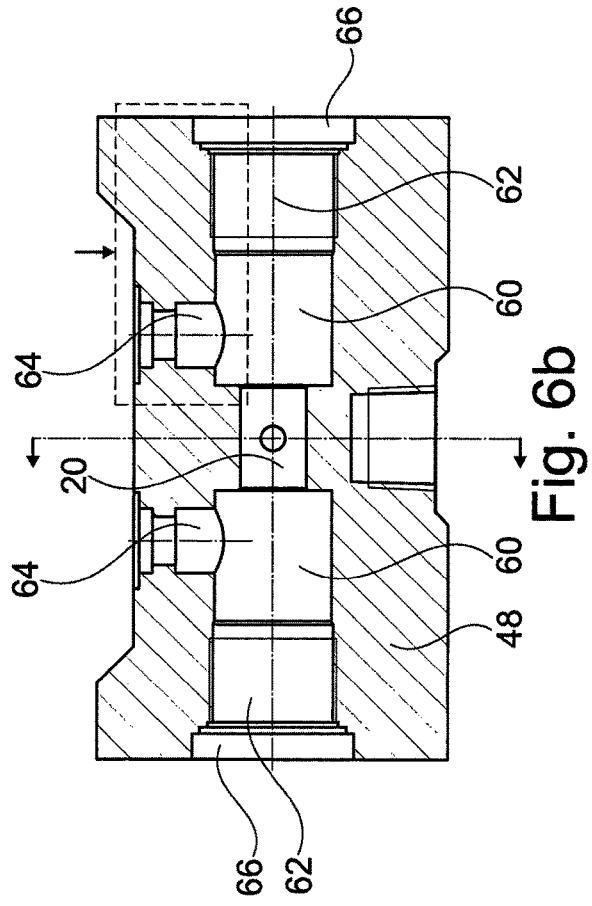

VALVE ASSEMBLY

The invention to which this application relates is to a valve assembly of a type which can be used to control the flow of fluid along a pipeline, with the valve assembly having one or more valve balls located therein. The valve balls each have a channel formed therein and the balls can be selectively moved between a first position in which the channel is in line with the pipeline and thereby allow the flow of fluid therethrough, and a second position in which the channel is not in line with the pipeline and thereby prevents the flow of fluid through the valve.

This type of valve is well known and one known form of the same is referred to as a double block and bleed valve in which two, in line, valve balls and valve seating assemblies therefore are provided. In addition, at both end, there is required to be provided a means for sealing the valve once the valve balls have been placed into position within the valve body, and then, at each end, there is required to be provided a fitting means of a suitable form to allow the valve to be fitted to respective fittings on the pipeline.

There is an increasing demand for valves of this type to be manufactured and the same do have to be manufactured in a manner to meet recognised international standards which can mean that it can be difficult to provide the required components within the required length parameters of the valve.

The Applicant has realised these problems and addressed the same by providing a valve assembly of the type set out in their co-pending patent applications GB2482252 and EP2430339. In this arrangement, there is provided a valve body with a passage formed therethrough and first and second valve balls are located in the passage with movement assemblies being provided for each of the respective valve balls to move the same between the first and second positions. Intermediate the valve balls, there is located a seating assembly which includes a plurality of biasing means which act on first and second valve ball seats with respect to the flow of fluid through the valve so as to ensure that the appropriate valve seat is biased towards the valve ball to provide a sealing effect. At one or both ends of the valve body there is provided a sealing means assembly which includes a valve seat for the adjacent ball and biasing means for biasing the said valve seat against the valve ball and the end sealing means is engaged in position with respect to the valve body. There is then provided the fitting means and the fitting assembly includes means to allow the valve body to be secured to the end of the pipeline with which the valve is to be used.

Conventionally, when manufacturing valves of the type described above, the valve body will be formed, typically by machining and then the valve balls, movement assemblies therefore, intermediate sealing assembly, end sealing assemblies and the end fitting assemblies are placed into position.

Conventionally, once the valve is formed with all the components mentioned above, the valve is then factory tested to meet the required standards and, once passed, the valve assembly will be transported from the factory to the point of location for fitting to the pipeline. Thus, in practice, the complete valve will be factory tested and will have been manufactured in relation to a specific customer and pipeline fitting. A significant problem therefore exists in that each valve is required to be wholly formed and tested at the point of manufacture to meet international standards and also to meet different pressure requirements and/or be provided with a specific form of a range of possible fitting configurations. These options are selected as a result of the customer requirements and/or the specific purpose to which the valve is to be put and/or the geographical and/or environmental conditions in which the valve is ultimately to be used. In each case the end result is that each valve which is manufactured at the factory is effectively manufactured as a bespoke manufacturing process, with the valve being provided for a specific product selected with a range of possible pressure options, sealing options and/or pipe fitting configurations which means that a large range of possible permutations exist. For example, such large number of permutations is a result of there being, for any particular conventional valve, different material types, different coating types, different flange types, different threaded connections and different pressure ratings required. This all leads to a large number of permutations which all have to be taken into account at the time of manufacture of the valve at eth factory and means that specific valves have to be manufactured to specific orders at the factory.

This means that the manufacture of the valves is relatively time consuming and is required to be performed entirely at the manufacturing location where, due to the differences and variations which can be selected, makes it difficult to achieve any uniform and streamlined manufacturing process.

The aim of the present invention is therefore to provide a valve assembly and method of formation of the same which allows a more streamlined production method to be achieved whilst, at the same time, ensuring that the required safety standards are met and tested under required testing conditions whilst allowing flexibility in the manufacture of the valve.

In a first aspect of the invention there is provided valve assembly, said valve assembly including a body in which there is housed at least one valve ball, a movement assembly for moving the ball between closed and open positions with respect to a channel which passes through and joins opposing ends of the body and at, or towards, the respective opposing ends of the valve body there are provided sealing means and means to retain the components within the valve body and form a modular unit and wherein positioned in the valve body outwardly of each of the sealing means there is provided a fitting means engaged with the valve body and the form of the fitting means is selected and fitted to the modular unit independently of the said retaining means.

In one embodiment the retaining means are provided in the form of at least one annular member engaged with the valve body to retain the valve seat, biasing means and at least one ball in the valve body.

In one embodiment the sealing means include including a valve seat and biasing means to bias the valve seat towards contact with the ball.

Typically the fitting means is provided in the form of an annular member which is threadedly engaged with the valve body. The particular fitting means which is used is selected with respect to the sealing type which is to be used between the valve assembly and the pipeline fitting to which the same is to be fitted and/or the required pipeline fitting configuration.

In one embodiment the fitting member is selected in order to define a particular configuration of the valve and the modular unit is common to a range of possible configurations. This therefore avoids the need for the whole valve assembly to be integrally formed to suit a particular valve configuration. Typically, at least two valve balls are housed within the body.

In one embodiment, the assembly of the first and second spaced valve balls, movement assemblies therefore, valve seats therefore, biasing means and sealing means at each end is performed independently of and remotely from the location of the fitting means with the valve body.

In one embodiment, the fitting means are selected and located with the valve body at a location remote to the factory and/or at the location of the fitting of the valve to the pipe fitting.

In one embodiment, the modular unit is subject to factory testing as an integrated unit module and then the tested unit can be supplied to a supply agent location which is relatively local to the location of use of the valve for the addition of the fitting means and the complete valve assembly is then supplied to the pipe fitting location.

The ability, in accordance with the invention, to provide an initial modular unit allows the same to be tested under factory conditions to meet standard requirements and, more importantly, allows a large number of modules to be manufactured more efficiently and then subsequently, to be configured to meet a particular valve assembly requirement and/or configuration within a range of possible configurations and the configuration can be performed at a location remote from the initial factory where the module is formed. It is now possible to make the modules to the highest pressure rating and test them at the factory prior to sending them out to the assembly location where, for example, flanges of the appropriate type can be added—only the seals between the flanges and the module need to be tested at the assembly location.

A further advantage of providing a modular unit as above is that as assembly locations are more local to the point of use, then it becomes much easier to meet local regulations, for example, in places like Brazil, Saudi Arabia, Malaysia etc., which require a certain percentage of the product to be "local content". The addition of, for example, flanges to the module at the assembly location would subsequently classify as "local content".

In a further aspect of the invention there is proved a method of forming a valve assembly, said method comprising the steps of: forming a valve body with a channel passing therethrough and joining opposing ends of the body; moving at least a first valve ball into position in the body so that the same is selectively moveable between a first, channel open position and a second, channel closed position; providing a valve seat at opposing sides of the said ball; providing biasing means to bias the respective valve seats into contact with the at least one valve ball; and providing an annular member at or towards each of said ends engaged with the valve body in order to retain the at least one valve ball, valve seats and biasing means to form a modular unit, and wherein fitting means incorporating a selected pipe fitting configuration are selectively fitted to the valve body of the modular unit.

In one embodiment, first and second valve balls are moved into position in the valve body. In one embodiment a valve seat assembly is located intermediate the first and second valve balls.

In one embodiment, the method includes testing the modular unit to ensure that the same meets relevant safety requirements prior to selecting and engaging the fitting means to the modular unit.

In one embodiment, the selected fitting means are located on the modular unit at a geographically remote location to the point of manufacture of the modular unit.

Typically, the selected fitting means, serve to configure the modular unit into a valve assembly to a particular customer required configuration and serves to adapt the modular unit, which may be configured into a range of possible valve configurations to be achieved without the need for the entire valve assembly to be manufactured for specific customer requirement.

In another aspect of the present invention, there is provided pipe fitting means for attachment to a valve assembly, said pipe fitting means engageable with the valve assembly and selected to suit and attach to/with a particular pipeline fitting that is required and is to be used for that particular valve assembly.

Typically, said pipe fitting means are provided with threaded connections, socket and butt weld connections, hubbed connections and/or other bespoke connections. Further typically, each of the pipe fitting types are selectively used with a modular unit to form the same into a required valve assembly configuration.

In one embodiment, the said pipe fitting means to be used is selected with respect to the sealing type which is to be used between the valve assembly and the fitting means.

In another aspect of the present invention, there is provided a pipeline including a valve assembly as described above.

Figure 5B:
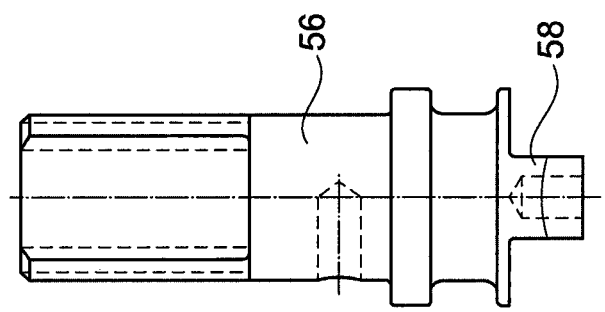
Figure 5A:
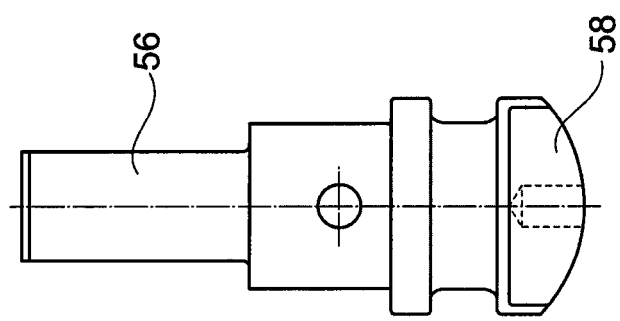

Specific embodiments of the invention are now described with reference to the accompanying drawings wherein FIG. 1 illustrates in a schematic manner, a pipeline with a valve fitted thereto, FIG. 2 illustrates a valve assembly formed in accordance with one embodiment of the invention in cross-section along line AA, FIG. 3 illustrates the modular unit of the valve assembly formed in accordance with the invention;

FIGS. 4a-i illustrate fitting means which may be selectively located on the modular unit of FIG. 3;

FIGS. 5a-b illustrate expanded views of a handle mechanism to be used with a valve assembly in accordance with the invention; and FIGS. 6a-c illustrate enlarged views of the modular unit of the valve assembly formed in accordance with the invention.

Figure 7:
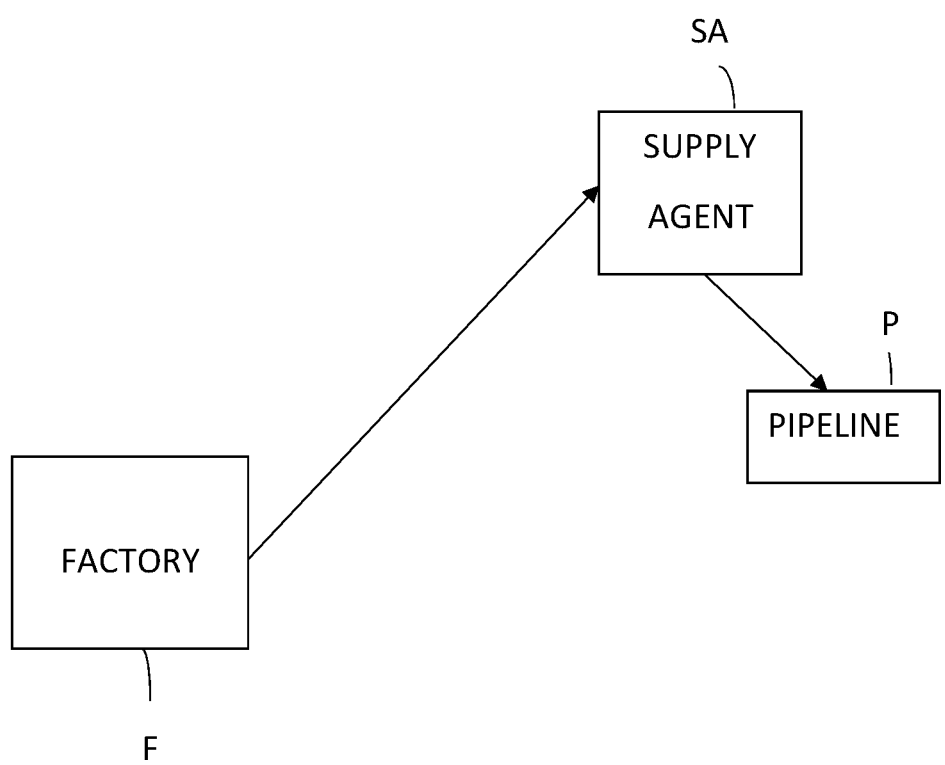

FIG. 7 is a diagram illustrating relative locations of a factory, a supply agent and a pipeline according to an embodiment of the present invention.

Referring firstly to FIG. 1, there is illustrated a pipeline 2 which incorporates a first portion of pipeline 4 and a second portion of pipeline 6 which are connected to a valve assembly 8 via means of flanges 10, 12 provided on the pipeline ends and pipe fittings 14, 16 provided at the opposing ends of the valve assembly. The particular type of pipe fitting which is provided at the ends of the valve assembly, are selected with respect to the type of pipe fitting flanges 10, 12 provided on the pipeline and/or the pressure and/or other parameters of operation required for the valve assembly. It will therefore be appreciated that there are a number of different parameters which are relevant when deciding on a particular pipe fitting 14, 16 which needs to be provided at the ends of the valve assembly and which therefore can require many different types of variations of valve assembly to be conventionally manufactured for specific customer requirements.

FIG. 2 illustrates in more detail, a pipeline fitting in section along line AA, and of a form in accordance with the current invention. The valve assembly 8 includes a valve body 18 which has a channel 20 formed therealong. The channel includes, in this particular embodiment, first and second valve balls 22, 24 which are provided with a channel therethrough which matches, when the valve balls are in an open position, with the channel 26 which passes along the valve body and thereby interconnects the pipeline portions 4, 6. It will, however, be appreciated by the skilled person that the present invention will work equally well if the valve assembly is provided with only one valve ball. Movement assemblies 28, 30 are provided for the respective valve balls to allow the same to be moved between the first and second positions by rotation about the respective axis 32, 34. Intermediate the valve balls there is provided a valve seat assembly (not shown) which provides valve seats for the respective valve balls 22, 24 and this is covered in the Applicant's co-pending patent and patent applications as already referred to.

At each end of the valve body, there is provided sealing means including a valve seat 36, 38 for the adjacent valve ball and an annular member 40, 42 which is provided for threaded engagement with the respective internal wall portions 44, 46 of the valve body so as to retain the annular member 40, 42 in position in the valve body along with the valve balls and valve seats and thereby form a modular unit 48. The modular unit is shown in FIG. 3 with the additional features of retaining bolts 52 protruding from each end of the valve body to allow engagement with a pipeline fitting and with fitting means 50 which are located at the opposing ends of the modular unit. The fitting means are, in this particular embodiment, provided in threaded engagement with the valve body in a similar way, but separately from, the annular member of the sealing means to which the fitting means are adjacently positioned.

As shown in FIGS. 4a-f, the particular pipe fitting which is used, and which is attached to the respective ends of the modular unit 48, are selected to suit the particular pipeline fitting which is required and is to be used for that particular valve assembly. For example, with regard to FIG. 4a, there are provided five alternative, differently dimensioned pipeline fittings in the form of ring type joints with raised face joint connections and each of which can be selectively engaged to the modular unit 48.

Figure 4G:
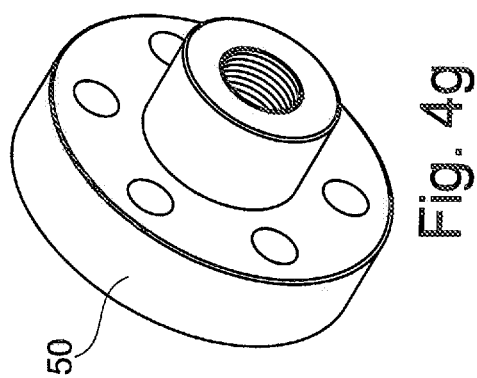
Figure 4H:
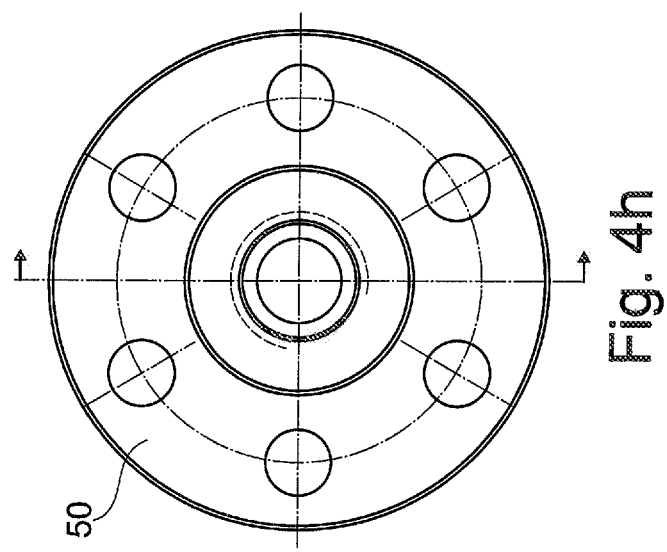
Figure 4I:
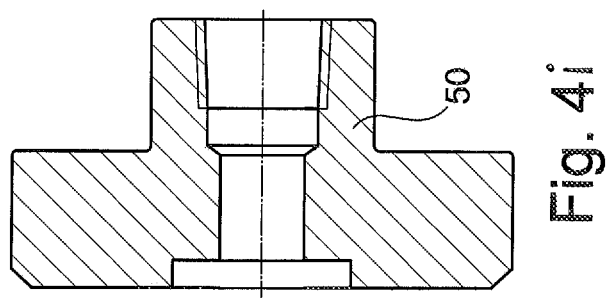

FIG. 4b illustrates pipe fittings which have threaded connections. FIG. 4c illustrates a pipe fitting which has a sample probe and injection quill facility. FIG. 4e illustrates pipe fittings which have a socket and butt weld connection. FIG. 4d illustrates pipe fittings with hubbed connections and FIG. 4f illustrates pipeline fittings with bespoke connections and each of the pipe fitting types can be selectively used with the modular unit to form the same into the required valve assembly configuration. FIGS. 4g-i illustrate plan and sectional views of a further embodiment of a pipe fitting which has an internal threaded connection.

FIGS. 5a-b illustrate expanded views of a handle mechanism used to rotate the valve balls 22, 24 about the respective axes 32, 34. The views in FIGS. 5a and b are shown at 90° to one another and show the component 56 provided to link the valve balls 22, 24 with the movement assemblies 28, 30, in order to allow the latter to rotate the former. The component 56 has a protruding lower end 58 which can be located in a corresponding recess in the top of the valve ball 22, 24, linking the component to the ball and allowing rotation of the same.

FIGS. 6a-b illustrate the modular unit 48 from a top view and in an enlarged cross-sectional view, prior to the inclusion of any additional components. As can be seen, in particular, from FIG. 6b, the modular unit 48 is shown as a shell prior to insertion of the component parts. For example, valve balls 22, 24 will subsequently be located in region 60 of the module 48, retaining components in the form of the valve seats 36, 38 and the annular member 40, 42 are located in region 62 to retain the valve balls 22, 24 in position, and the components 56, 58 of the movement assemblies 28, 30 are located through region 64 of the modular unit 48. Testing of the modular unit 48 can then be carried out at the point of manufacture, with the unit subsequently being delivered to the location at which the unit is required. Once at the required location, the fitting means are then fitted into region 66 of the modular unit 48. The appropriate fitting means for connecting the modular unit 48 to the desired pipe line can be determined after delivery of the modular unit 48, which is particularly advantageous because this removes the risk of receiving a unit the does not fit/connect with the required pipe line; having various forms of fitting means at the location of the pipe line for connecting the same to the modular unit 48 allows the user to determine which is most appropriate, ensuring a clean and secure connection/linkage. FIG. 6c displays a close up of the modular unit 48 and the portion in which the component 56 for linking the valve balls 22, 24 and the movement assemblies 28, 30 is located.

It will therefore be appreciated that the modular unit 48 is common to each of these potential pipeline fitting types and so the particular pipeline fitting can be selected and attached as fitting means to the respective ends of the modular unit body and in threaded engagement with the internal channel faces 44, 46 of the valve body. Thus, the modular unit 48 is common and can be manufactured under factory conditions and then the same modular type of unit 48 can then be dispatched to different geographical locations having already been tested at the factory and then adapted or configured to suit particular requirements of use at the different geographical locations. FIG. 7 illustrates an example in which supply agent SA, which receives the tested sealed modular unit 48 and fits a selected fitting means type to the unit 48, is at a location that is geographically remote from factory F and is more local to the location of pipeline P in which unit 48 is to be used and fitted to the pipeline fitting than the location of factory F.

This therefore avoids the conventional approach of having to manufacture the whole valve assembly at the factory.

The invention claimed is:

1. A valve assembly, said valve assembly including a body in which there is housed at least one valve ball, a movement assembly for moving the at least one ball between closed and open positions with respect to a channel which passes through and joins opposing ends of the body and at, or towards, the respective opposing ends of the valve body there are provided sealing means and retaining means in threaded engagement with the valve body to retain the components within the valve body and this forms a sealed integrated modular unit formed under factory conditions and, positioned on the valve body outwardly of each of the sealing means there are provided fitting means engaged with opposing ends of the valve body and the form of the fitting means is selected, and the same are fitted to the modular unit, independently of, and subsequently to, the said retaining means, and the said fitting means are provided in the form of annular members, and the particular fitting means which are used is selected with respect to the sealing type which is to be used between the valve assembly and the pipeline fitting to which the same is to be fitted in order to define a particular configuration of the valve assembly, and the modular unit is common to a range of possible valve assembly configurations, of the selectable fitting means types is threadedly engageable with the modular unit and characterised in that the said sealed integrated modular unit is subject to factory testing once formed and then the tested sealed integrated modular unit is supplied to a supply agent location and at which supply agent location the fitting of the selected fitting means type to the sealed integrated modular unit occurs and the complete valve assembly is then supplied to be fitted to the pipeline fitting at the pipeline location wherein the said supply agent location is geographically remote from the factory and said supply agent location is more local to the location of the pipeline with which the valve assembly is to be used than the location of said factory.

2. A valve assembly, said valve assembly including a body in which there is housed at least one valve ball, a movement assembly for moving the at least one ball between closed and open positions with respect to a channel which passes through and joins opposing ends of the body and at, or towards, the respective opposing ends of the valve body there are provided sealing means and retaining means in threaded engagement with the valve body to retain the components within the valve body and this forms a sealed integrated modular unit formed under factory conditions and, positioned on the valve body outwardly of each of the sealing means there are provided fitting means engaged with opposing ends of the valve body and the form of the fitting means is selected, and the same are fitted to the modular unit, independently of, and subsequently to, the said retaining means, and the said fitting means are provided in the form of annular members, and the particular fitting means which are used is selected with respect to the sealing type which is to be used between the valve assembly and the pipeline fitting to which the same is to be fitted in order to define a particular configuration of the valve assembly, and the modular unit is common to a range of possible valve assembly configurations, of the selectable fitting means types is threadedly engageable with the modular unit and characterised in that the said sealed integrated modular unit is subject to factory testing once formed and then the tested sealed integrated modular unit is supplied to a supply agent location and at which supply agent location the fitting of the selected fitting means type to the sealed integrated modular unit occurs and the complete valve assembly is then supplied to be fitted to the pipeline fitting at the pipeline location characterised in that once the said fitting means have been attached to the sealed integral modular unit to form the said valve assembly only the seals between the selected fitting means and the said sealed integral modular unit of the valve assembly are required to be tested before the valve assembly is fitted to the pipeline fitting.

3. A valve assembly according to claim 2, wherein the fitting means is provided in the form of an annular member, which is threadedly engaged with the valve body.

4. A valve assembly according to claim 2 wherein the retaining means are provided in the form of at least one annular member engaged with the valve body to retain the valve seats, sealing means and at least one ball in the valve body.

5. A valve assembly according to claim 2 wherein the sealing means include including a valve seat and biasing means to bias the valve seat towards contact with the ball.

6. A valve assembly according to claim 2, wherein the fitting means are provided with one of the types of the fitting means type selected from one of a plurality of selectable fitting means types that include threaded connections, socket and butt weld connections, hubbed connections and/or other bespoke connections.

7. A valve assembly according to claim 2, wherein at least two valve balls are housed within the body and each provided with sealing means therefore.

8. A valve assembly according to claim 2, wherein the assembly of the at least first valve ball, movement assemblies therefore, valve seats therefore, biasing means and sealing means at each end is performed independently of and remotely from the location of the fitting means with the valve body.

9. A valve assembly according to claim 2, wherein the fitting means are selected and located with the valve body at a geographical location remote to the factory and/or at the location of the fitting of the valve to the pipe fitting.

\* \* \* \* \*